United States Patent Office 3,422,113
Patented Jan. 14, 1969

3,422,113
3-ARYL-7-TRIAZOLYL CARBOSTYRIL
Wolf-Dieter Wirth, Cologne-Stammheim, Hans Knupfer, Bergisch Neukirchen, and Carl-Wolfgang Schellhammer, Opladen, Germany, assignors to Farbenfabriken Bayer Aktiengesellschaft, Leverkusen, Germany, a corporation of Germany
No Drawing. Filed Nov. 15, 1965, Ser. No. 507,693
Claims priority, application Germany, Nov. 28, 1964, F 44,567
U.S. Cl. 260—288              9 Claims
Int. Cl. C07d 57/00; C08k 1/75

ABSTRACT OF THE DISCLOSURE

Brightening compositions containing 3-phenyl-7-aryl-triazolyl-carbostyrils.

---

The present invention relates to brightening agents: more particularly it concerns brightening agents which contain as active component 3-phenyl-7-aryltriazolyl-carbostyril compounds of the formula

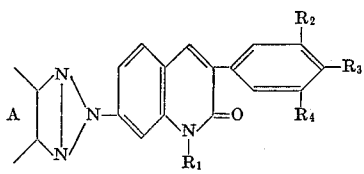

In this formula $R_1$ means a hydrogen atom or a lower alkyl group such as methyl or ethyl group, $R_2$, $R_3$ and $R_4$, independently of each other, are hydrogen atoms, alkyl groups with 1–12 carbon atoms such as linear alkyl, alkoxy groups such as methoxy or ethoxy groups, or halogen atoms such as chlorine or bromine atoms, and A is an aromatic radical such as, for example, the phenylene, naphthylene or acenaphthylene radical, which may also be substituted, for example by lower alkyl or alkoxy groups.

The brightening agents of the invention which may contain in addition to the active component specified above commonly applied additives such as sodium sulphate or urea are suitable for the brightening of the most diverse materials, mainly for the brightening of fibres, threads, woven or knitted materials or foils of synthetic origin, especially for the brightening of materials of polyvinyl chloride and polyesters, moreover for the brightening of lacquers, particularly of lacquers based on nitrocellulose or cellulose acetate. The quantities of brightening agents required in each case can easily be determined by preliminary experiments; in general, quantities of 0.1–1% of the active component of the brightening agent, referred to the weight of the material to be treated, are sufficient.

The 3-phenyl-7-aryltriazolyl-carbostyrils to be used according to the invention for brightening purposes are obtainable, for example, by condensing 2-amino-4-nitrotoluenes of the formula

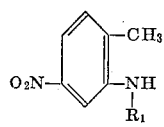

with phenylglyoxylic acid ethyl esters of the formula

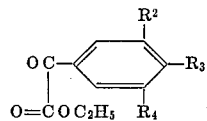

to give 3-phenyl-7-nitrocarbostyrils of the formula

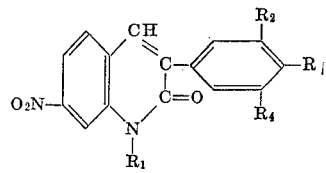

reducing the resulting nitro compounds to the corresponding amino compounds, then diazotising these, reacting the diazonium salts obtained with primary aromatic amines, which couple in the ortho-position to the primary amino group, and oxidising the resultant o-aminoazo dyestuffs to the corresponding triazole compounds. In the Formulae I to III, $R_1$ to $R_4$ have the meaning given above.

The following examples serve to illustrate the invention without, however, limiting its scope; the parts given are parts by weight.

EXAMPLE 1

65 parts polyvinyl chloride with a K value of about 72–74, 35 parts dioctyl phthalate, 2 parts of a commercial organic tin compound serving for the stabilisation of the polyvinyl chloride, 1 part titanium dioxide rutile and 0.1 part 1-methyl-3-phenyl-7-(4'-methyl-5'-methoxybenzotriazolyl)-carbostyril as brightening agent are rolled for about 5 minutes at about 165–170° C. on a hot roll with little friction; the rough sheet obtained is then drawn off on a four-roll calender to give a foil of about 300μ thickness. The foil is excellently brightened, the brightening effect has outstanding fastness to light.

The brightening agent used was prepared in the following way:

52 parts 2-methylamino-4-nitrotoluene, 57 parts phenyl-glyoxylic acid ethyl ester and 5 parts piperidine were heated, whilst stirring, for 8 hours at 200° C. 18 parts of the 1-methyl-3-phenyl-7-nitrocarbostyril thus obtained were then heated on a water bath in a mixture of 50 parts alcohol and 50 parts concentrated hydrochloric acid and treated, whilst stirring, with a solution of 50 parts tin-II-chloride in 100 parts concentrated hydrochloric acid. The reaction mixture was stirred for a further hour and then cooled. The precipitated 1-methyl-3-phenyl-7-aminocarbostyril was filtered off, brought to the boil with 200 parts of a 5% sodium hydroxide solution, then filtered off while hot, dried and recrystallised from xylene. 5.9 parts of the 1-methyl-3-phenyl-7-aminocarbostyril of melting point 184–185° C. thus obtained were dissolved with heating in 50 parts glacial acetic acid, and after the addition of 30 parts concentrated hydrochloric acid, the solution was cooled and the 1-methyl-3-phenyl-7-aminocarbostyril diazotised at 0–5° C. A solution of 3.4 parts 4-amino-2-methoxy-1-methylbenzene in 20 parts glacial acetic acid was then added to the diazonium salt solution, whilst stirring, the mixture was adjusted to a pH value of about 4 by the dropwise addition of a concentrated sodium hydroxide solution and then further stirred for a few hours. The resulting azo compound was filtered off, washed with water, dried and suspended in 130 parts pyridine. The suspension was treated with 10 parts copper acetate and boiled for 1 hour under reflux. After cooling, the precipitated reaction product was filtered off, washed with water and recrystallised from dimethyl formamide. The 1-methyl-3-phenyl-7-(4'-methyl-5'-methoxy-benzotriazoyl)-carbostyril thus obtained had a melting point of 300–303° C.

EXAMPLE 2

A mixture of 70 parts of polyesters, which were prepared from adipic acid and ethylene glycol, and of 30 parts styrene is treated with 2 parts of a 50% paste of cyclohexanone peroxide in dibutyl phthalate, 1 part titanium dioxide rutile and 0.2 part 1-methyl-3-phenyl-7-(4′ - methyl-5′-methoxybenzotriazolyl)-carbostyril; the mixture is poured into a mould and hardened at about 90–100° C. The resultant moulding is excellently brightened, the fastness to light of the brightening effect is outstanding.

EXAMPLE 3

In a lacquer solution of 165 parts commercial collodion cotton, 230 parts alcohol, 270 parts acetone, 270 parts ethylene glycol, 15 parts butanol, 25 parts dibutyl phthalate, 25 parts benzylbutyl phthalate, there is dissolved 1 part 1-methyl-3-phenyl-7-(4′-methyl-5′-methoxy benzotriazolyl)-carbostyril and the lacquer is poured on to a glass plate. The resultant cast moulding is excellently brightened, the fastness to light of the brightening effect is outstanding.

EXAMPLE 4

65 parts cellulose acetate (acetyl value 55%), 35 parts dimethyl phthalate, 0.7 part titanium dioxide rutile and 0.1 part 1-methyl-3-phenyl-7-(4′-methyl-5′-methoxybenztriazolyl)-carbostyril are mixed with each other at 135–145° C. for about 4–7 minutes on hot rolls. After cooling, the resultant rough sheet is comminuted and the granulate moulded by injection on an injection moulding machine. The injection mouldings obtained are excellently brightened, the fastness to light of the brightening effect is outstanding.

Instead of the 1-methyl-3-phenyl-7-(4′-methyl-5′-methoxy-benzotriazolyl)-carbostyril mentioned in the above examples, one of the following 3-phenyl-7-aryltriazolyl-carbostyril compounds can also be employed as brightening agent:

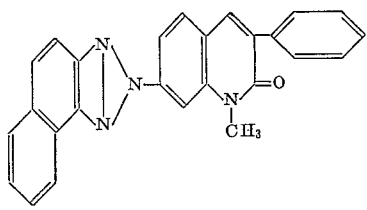

melting point 220–223° C.

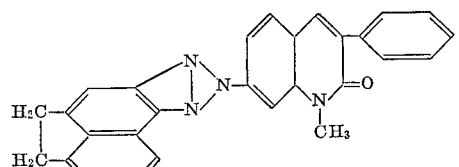

melting point 292–296° C.

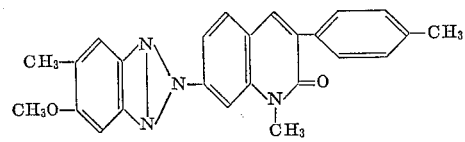

melting point 230–233° C.

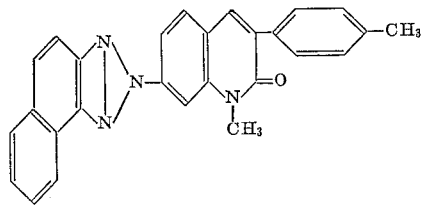

melting point 239–241° C.

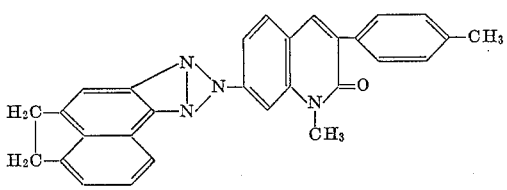

melting point 295–299° C.

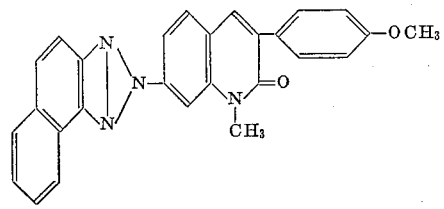

melting point 268–271° C.

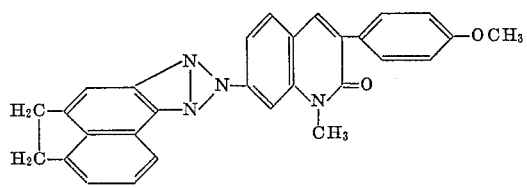

melting point 268–271° C.

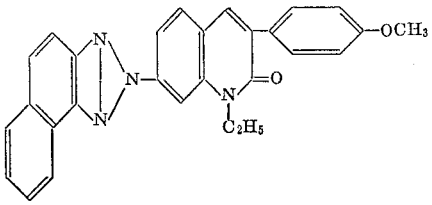

melting point 246–247° C.

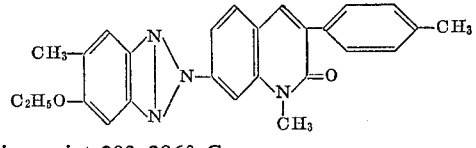

melting point 293–296° C.

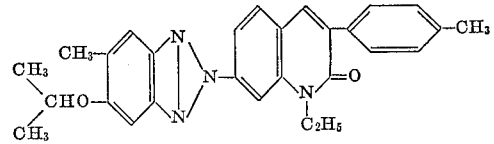

melting point 238–239° C.

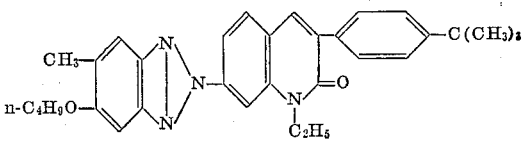

melting point 265–269° C.

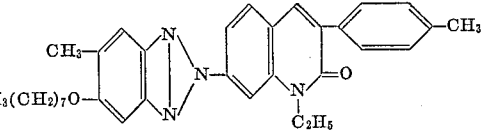

melting point 176–178° C.

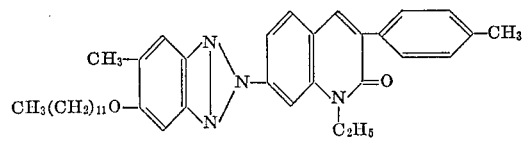

melting point 163–165° C.

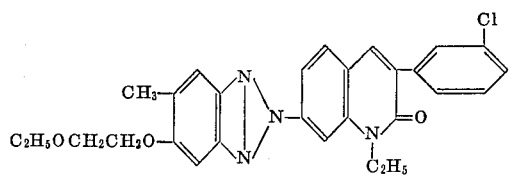

melting point 173–175° C.

These compounds are obtainable in such a way that in the production method described in Example 1, instead of 1-methyl-2-phenyl-7-aminocarbostyril, there are used 1 - methyl-(4'-methylphenyl)-7-aminocarbostyril, 1-methyl - 3-(4'-methoxyphenyl)-7-aminocarbostyril, 1-ethyl-3-(4'-methylphenyl)-7-aminocarbostyril, 1-ethyl-3-(4'-tert·butyl-phenyl)-7-aminocarbostyril or 1-ethyl-3-(3'-chlorophenyl)-7-amino-carbostyril, preparable in an analogous manner, and instead of 4-amino-2-methoxy-1-methylbenzene, 4-amino-2-ethoxy-1-methyl-benzene, 4-amino-2-isopropoxy - 1 - methyl-benzene, 4-amino-2-n-butoxy-1-methyl-benzene, 4-amino-2-n-octoxy-1-methyl-benzene, 4-amino-2-n-dodecoxy-1-methyl-benzene, glycolmonoethylmono-(2-methyl-5-amino)-phenylether, 2-aminonaphthalene or 5-aminoacenaphthene is employed as coupling component.

We claim:

1. Brightening composition containing as active brightening component a compound of the formula

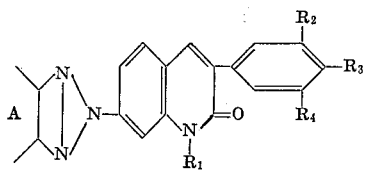

wherein $R_1$ stands for hydrogen and lower alkyl; $R_2$, $R_3$ and $R_4$ are independently members selected from the group consisting of hydrogen, linear alkyl of 1–12 carbon atoms, alkoxy and halo; and A is a phenylene, napthalene, acenaphthylene and corresponding substituted moieties having as substitutuents a member selected from the group consisting of lower alkyl, alkoxy, and alkoxyalkoxy.

2. The active component of claim 1 having the formula

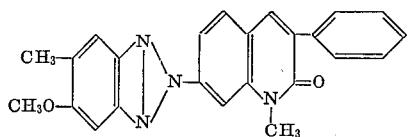

3. The active component of claim 1 having the formula

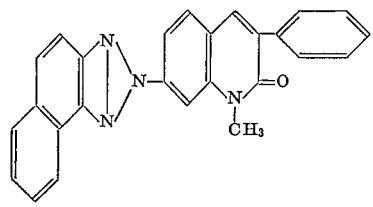

4. The active component of claim 1 having the formula

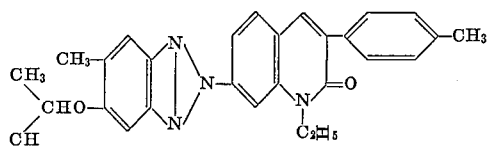

5. The active component of claim 1 having the formula

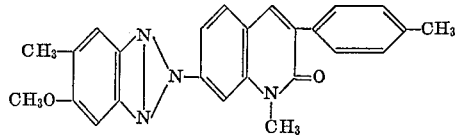

6. The active component of claim 1 having the formula

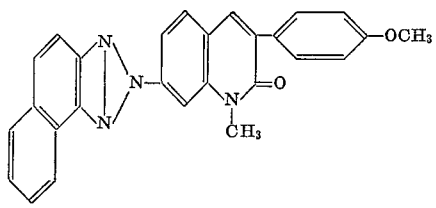

7. The active component of claim 1 having the formula

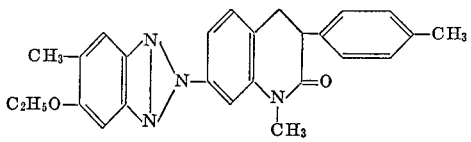

8. The active component of claim 1 having the formula

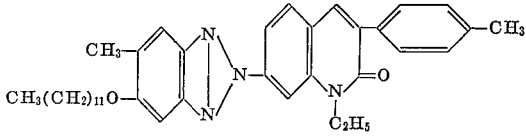

9. The active component of claim 1 having the formula

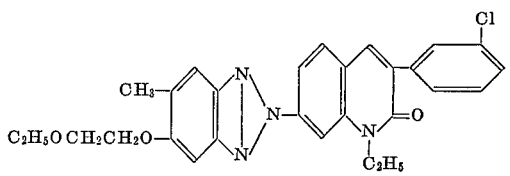

References Cited

UNITED STATES PATENTS

| | | | |
|---|---|---|---|
| 3,008,969 | 11/1969 | Pretka | 260—289 X |
| 3,341,530 | 9/1967 | Strobel | 260—247.2 |
| 3,351,482 | 11/1967 | Raue | 252—301.2 X |
| 3,356,689 | 12/1967 | Haeberli | 252—301.2 X |

OTHER REFERENCES

Kruse et al., Jour. Am. Chem. Soc., vol. 76, p. 5796 (1954).

ALTON D. ROLLINS, *Primary Examiner.*

D. DAUS, *Assistant Examiner.*

U.S. Cl. X.R.

252—301.2;—260—308, 577, 578; 106—288; 260—473, 289, 155;—8—88